Figure 1:
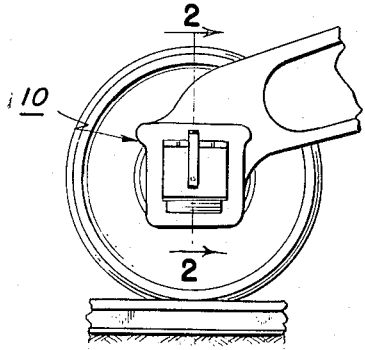

Jan. 8, 1957  C. J. CRAIN  2,776,863
OIL DISTRIBUTING DEVICE
Filed March 22, 1954

INVENTOR
CHESTER J. CRAIN

BY J. B. Dickman, Jr.
ATTORNEY

United States Patent Office 2,776,863
Patented Jan. 8, 1957

2,776,863
OIL DISTRIBUTING DEVICE

Chester J. Crain, Ava, Mo.

Application March 22, 1954, Serial No. 417,700

4 Claims. (Cl. 308—86)

This invention relates to a journal bearing and more particularly to oil distributing means therefor.

The primary object of this invention is to eliminate the use of cotton waste or the like in journal bearings and to thereby avoid the fire hazard incident to the use of such fibrous materials.

Another object is to distribute over the bearing surfaces of a conventional journal bearing an adequate and constant supply of lubricating oil.

Still another object is to prevent the escape of lubricating oil through the opening through which the axle enters the housing.

The above and other objects may be attained by employing this invention which embodies among its features an axle, a bearing block resting on said axle and having a groove therein which opens through the side thereof which engages the axle, an oil collecting tray carried by the bearing block and communicating with the groove, an oil reservoir beneath the bearing block, and means carried by the axle and dipping into the reservoir for delivering oil from the reservoir to the tray.

Other features include means carried by the tray and engaging the means which dips into the reservoir for wiping oil therefrom and directing it into the tray.

Still other features include a seal carried by the reservoir and encircling the axle adjacent the end of the bearing block remote from the tray, for preventing the escape of oil from the reservoir.

Figure 2:
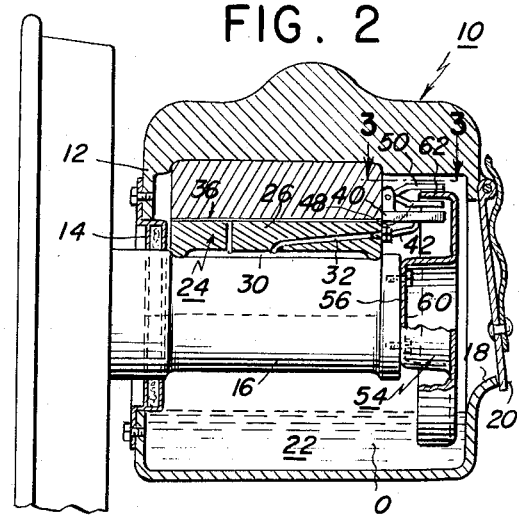
Figure 3:
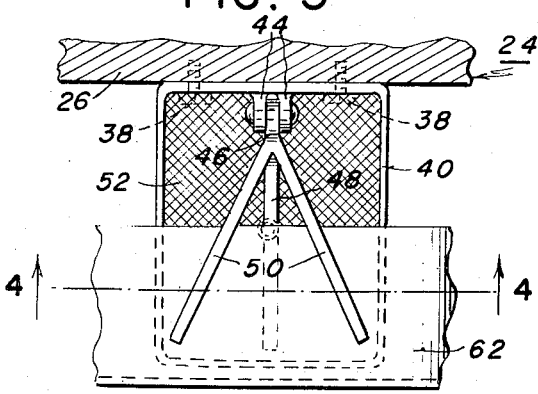
Figure 5:
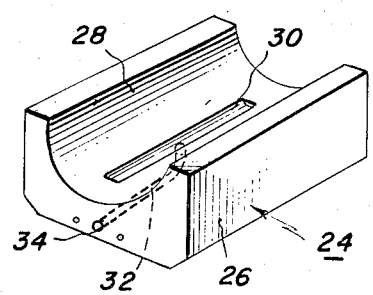
Figure 4:
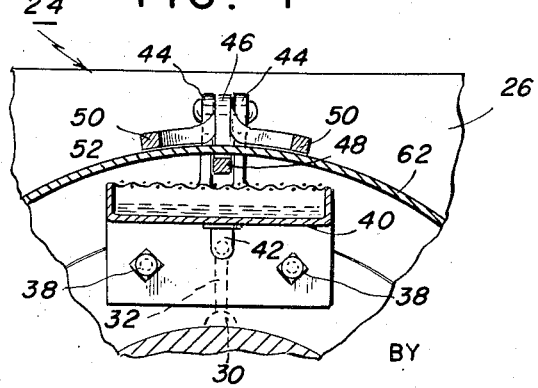
Figure 6:
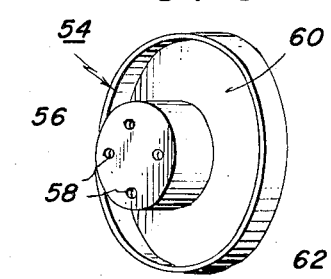

In the drawings:

Fig. 1 is a fragmentary side view of a railway truck,

Fig. 2 is a fragmentary enlarged sectional view taken substantially on the line 2—2 of Fig. 1, Fig. 3 is a fragmentary enlarged sectional view taken substantially on the line 3—3 of Fig. 2, Fig. 4 is a fragmentary sectional view taken substantially on the line 4—4 of Fig. 3, Fig. 5 is an inverted perspective view of the bearing block, and Fig. 6 is a perspective view of the oil pick-up wheel.

Referring to the drawings in detail, a journal bearing designated generally 10 comprises a housing or box 12 having an opening 14 extending therethrough for receiving an axle 16 of conventional construction. The housing or box 12 is provided in its end remote from the opening 14 with an access opening 18 closed by a conventional cover 20. The lower portion of the housing 12 i. e. that portion below the lower ends of the openings 14 and 18 defines a reservoir 22 for containing lubricating oil 0.

Resting on the axle 16 within the housing 12 and partially embracing said axle is a bearing block designated generally 24 which comprises a body 26, usually of brass, having a substantially semi-circular axle receiving recess 28 extending therethrough. A longitudinally extending lubricant distributing groove 30 is formed in the body 26 and opens into the recess 28 substantially midway between opposite sides thereof and communicating with the groove 30 substantially midway between opposite ends of the body 26 is a passage or duct 32 which extends through the body and opens as at 34 through the end thereof adjacent the access opening 18. A suitable air vent 36 extends through the body 26 and establishes communication between the groove 30 and atmosphere at the top of the body 26.

Secured as by screws 38 to the body 26 is an oil collecting tray 40 which extends outwardly from the end of the body adjacent the access opening 18 and is provided with a drain pipe 42 which communicates with the passage 32 to deliver oil collected in the tray 40 to the groove 30. Carried by the tray and extending outwardly thereabove is a pair of spaced ears 44 between which is pivoted for movement in a vertical arcuate path a yoke 46 carrying an outwardly extending lower wiping fingers 48 and a pair of upper wiping fingers 50 which diverge as they recede from the yoke 46. In the preferred form of the invention, the pan or tray 40 is covered with a suitable filtering screen 52.

An oil pick-up wheel designated generally 54 is provided with a hub 56 having an annular row of screw receiving openings 58 extending therethrough for the reception of screws 60 by means of which the wheel 54 is attached to the end of the axle 16 adjacent the tray 40. Carried by the hub 56 and extending outwardly therefrom adjacent the end thereof remote from the axle is an annular web 62 which carries at its outer edge an annular oil pick-up rim 64. This rim extends toward the axle 16 and moves in a circular path between the upper and lower wiping fingers 50 and 48 respectively which path enters the reservoir 22 so that as the axle 16 rotates in the recess 28 in the bearing block 24 successive portions of the rim 64 will be submerged in the oil O. The oil which adheres to the rim 64 will be carried upwardly thereby to be wiped therefrom by the wiping fingers 48 and 50 and delivered to the tray 40 to flow through the screen 52, pipe 42 and passage or duct 32 to the groove 30 by which it is distributed over the bearing surface of the axle 16.

What is claimed is:

1. In a journal bearing of the type comprising a housing having an oil reservoir, an axle extending into the housing above the reservoir and a bearing block resting on the axle within the housing and having an oil distributing groove extending through the side thereof adjacent the axle, an oil pick-up wheel carried by the axle for rotation therewith and having its rim dipping into said oil reservoir for supplying oil from the reservoir to the groove, wipers pivotally mounted to the bearing block and extending into contact with both sides of the rim of the oil pick-up wheel for wiping oil therefrom, an oil tray carried by the bearing block below the wipers for collecting oil from the oil pick-up wheel, and a drain pipe connected to a passage in said bearing block for delivering oil to said oil distributing groove.

2. In a journal bearing of the type comprising a housing having an oil reservoir, an axle extending to the housing above the reservoir and a bearing block resting on the axle within the housing and having an oil distributing groove extending through the side thereof adjacent the axle, an oil pick-up wheel carried by the axle for rotation therewith, and oil pick-up rim carried by the wheel and extending toward the bearing block, an oil collecting tray carried by the block and extending therefrom between the rim and the axle, a duct in said bearing block, a drain pipe connecting said oil collecting tray with said duct, and wiping fingers pivotally connected to said tray and engaging both sides of the rim for wiping oil therefrom and delivering it to the tray.

3. In a journal bearing of the type comprising a housing having an oil reservoir, an axle extending into the housing above the reservoir and a bearing block resting on the axle within the housing and having an oil distributing groove extending through the side thereof adjacent the axle, an oil pick-up wheel carried by the axle for rotation therewith, an oil pick-up rim carried by the wheel and extending toward the bearing block, an oil collecting tray carried by the block and extending therefrom between the rim and the axle, and having communication with the groove for delivering oil thereto, wiping fingers pivotally mounted to said tray and engaging both sides of the rim for wiping oil therefrom and delivering it to the tray, and a filtering screen carried by the tray beneath the fingers for filtering the oil delivered to the tray.

4. In a journal bearing of the type comprising a housing having an oil reservoir, an axle extending into the housing above the reservoir and a bearing block resting on the axle within the housing and having an oil distributing groove extending through the side thereof adjacent the axle, an oil pick-up wheel carried by the axle for rotation therewith and having a rim dipping into said oil reservoir, wiping fingers pivotally connected to the bearing block and extending into contact with both sides of the rim of the oil pick-up wheel for wiping oil therefrom, a tray carried by the bearing block below the wiping fingers, a drain pipe, a duct connected to said drain pipe, said drain pipe and duct delivering oil from the oil tray to the oil distributing groove, an air vent in said bearing block between a remote part of said oil distributing groove and the inside of said housing and an oil seal carried by the housing and encircling the axle adjacent the end of the bearing block remote from the wiping fingers for confining oil to the housing.

References Cited in the file of this patent

UNITED STATES PATENTS

| 304,548 | Parker | Sept. 2, 1884 |
| 1,453,221 | Worosila | Apr. 24, 1923 |
| 1,681,645 | Padilla | Aug. 21, 1928 |

FOREIGN PATENTS

| 21,085 | Great Britain | 1908 |
| 519,878 | Germany | Mar. 5, 1931 |
| 899,490 | France | May 31, 1945 |